(12) United States Patent
McNicholas

(10) Patent No.: US 7,080,764 B2
(45) Date of Patent: Jul. 25, 2006

(54) TRANSPONDER COVER AND METHOD FOR MOUNTING TOGETHER WITH TRANSPONDER

(76) Inventor: Linda McNicholas, 27 E. 63rd St., New York, NY (US) 10021

(\*) Notice: Subject to any disclaimer, the term of this patent is extended or adjusted under 35 U.S.C. 154(b) by 73 days.

(21) Appl. No.: 10/250,116

(22) Filed: Jun. 4, 2003

(65) Prior Publication Data
US 2004/0245302 A1 Dec. 9, 2004

(51) Int. Cl.
*B60R 7/00* (2006.01)
(52) U.S. Cl. .................... 224/482; 224/929; 40/593
(58) Field of Classification Search ............... 224/929, 224/482, 277, 564–566; 40/593, 594, 591; 150/154, 158, 163–164; 190/103; 206/564–565, 206/305, 320, 576, 387.1, 387.13; 220/23.91, 220/676, 784
See application file for complete search history.

(56) References Cited

U.S. PATENT DOCUMENTS

| 2,772,886 | A | * | 12/1956 | Parmele .................... 150/158 |
| 3,506,049 | A | * | 4/1970 | Gerard ..................... 150/158 |
| 3,900,129 | A | * | 8/1975 | Scholz ..................... 220/784 |
| 4,570,038 | A | * | 2/1986 | Tinelli ..................... 379/452 |
| 5,265,720 | A | * | 11/1993 | Meliconi ................... 206/305 |
| 5,383,091 | A | * | 1/1995 | Snell ....................... 150/154 |
| 5,960,572 | A | * | 10/1999 | DeVito ..................... 40/593 |
| 6,127,938 | A | * | 10/2000 | Friedman .................. 340/693.6 |
| 6,179,122 | B1 | * | 1/2001 | Moncrief et al. ........... 206/320 |
| 6,658,775 | B1 | * | 12/2003 | Lanzisero .................. 40/593 |
| 6,663,063 | B1 | * | 12/2003 | Tatta ....................... 40/593 |
| 6,745,925 | B1 | * | 6/2004 | Brzyski .................... 40/593 |
| 2003/0214406 | A1 | * | 11/2003 | Epstein .................... 340/572.8 |

FOREIGN PATENT DOCUMENTS

| EP | 689180 | * 12/1995 |
| JP | 8-297760 | * 11/1996 |

OTHER PUBLICATIONS

Tagsak promotional materials from Tagsak Website (12 sheets; printed Sep. 4, 2003).

\* cited by examiner

*Primary Examiner*—Stephen K. Cronin
(74) *Attorney, Agent, or Firm*—Darby & Darby

(57) ABSTRACT

A combination for use in a motor vehicle comprises a sealed housing containing a transponder circuit suitable for interacting with an automated toll gate system, a cover that coordinates with the motor vehicle in accordance with at least one prescribed criterion, and an engagement means affixed to the cover and configured for engaging the transponder housing such that the housing and cover are affixed to one another. A method for mounting such a transponder within an automobile is provided in which a cover is provided that coordinates with the automobile in accordance with at least one predetermined criterion, the cover is engaged to the transponder housing whereby the cover and transponder housing are affixed to one another, a location in the automobile is selected for mounting the transponder, and the cover and transponder are mounted to the automobile in a single action.

8 Claims, 3 Drawing Sheets

TRANSPONDER COVER AND METHOD FOR MOUNTING TOGETHER WITH TRANSPONDER

FIELD OF THE INVENTION

The present invention relates to covers for concealing components within automobiles, and more particularly, to a cover for a transponder to permit vehicles to pass through toll gates.

BACKGROUND OF THE INVENTION

Many highways throughout the United States include toll gates which require vehicle occupants to pay a toll in order to pass along a portion of the highway. Historically, tolls were paid by tendering money to a toll clerk. In time, however, toll machines have replaced some toll clerks which can receive coins, count them, and permit vehicles to pass without interacting with a human. In more recent times, toll gates have been equipped with an Electronic Toll Collection (ETC) technology that permits cars to be automatically charged a toll through wireless interaction with a transponder mounted in each vehicle. An account associated with the transponder is debited each time that the vehicle passes through a toll gate equipped with this technology.

With the advent of such automated toll systems, vehicles can more rapidly pass through toll gates, and automobile congestion and pollution in and around toll gates has been greatly reduced.

The transponders are located in each car so as to have unobstructed radio transmission from the car and to transceivers located at the toll booth. Typically, transponders are mounted to the interior of the car windshield so as to have clear radio communication with the transceivers. The transponders applicable throughout the United States vary in size, dimension, and technology; however, common to all existing automated transponder systems is the fact that these transponders are included in the vehicle as an after-market addition. As such, the transponders rarely coordinate with the interior of the vehicle, an undesirable feature for many drivers including those of luxury vehicles.

What is needed in the art is improvements in transponder mountings, including specifically aesthetically pleasing covers for transponders, and the present invention satisfies this need and can prompt further interest in State/Government sponsored ETC programs.

SUMMARY OF THE INVENTION

In accordance with one aspect of the invention, a combination for use in a motor vehicle comprises a sealed housing containing a transponder circuit suitable for interacting with an automated toll gate system, a cover that coordinates with the motor vehicle in accordance with at least one prescribed criterion, and an engagement means affixed to the cover and configured for engaging the transponder housing such that the housing and cover are affixed to one another.

In accordance with another aspect of the invention, a method for mounting an automated toll pass transponder within an automobile is provided. The transponder has a housing containing the transponder circuitry. The steps of a method in accordance with this aspect of the invention include: providing a cover that is coordinated with the automobile in accordance with at least one predetermined criterion; engaging the cover to the transponder housing whereby the cover and transponder housing are affixed to one another; selecting a location in the automobile for mounting the transponder; and mounting the cover and transponder to the automobile in a single action.

These and other aspects, features, and advantages of the present invention can be appreciated from the accompanying Drawing Figures and Description of Certain Embodiments of the Invention.

BRIEF DESCRIPTION OF THE DRAWING FIGURES

DETAILED DESCRIPTION OF CERTAIN EMBODIMENTS OF THE INVENTION

Figure 1:
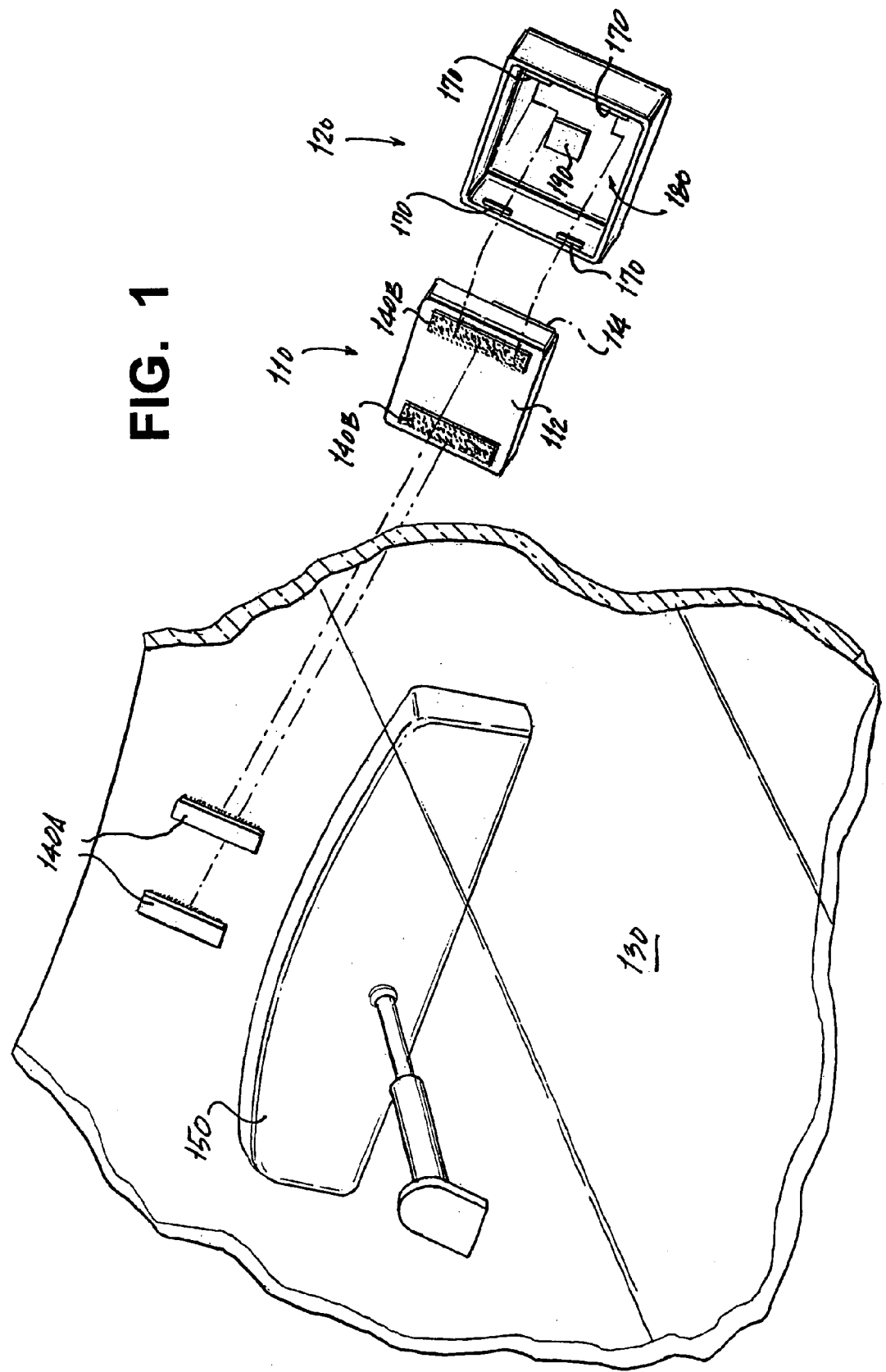
FIG. 1 is an exploded perspective view of a cover and transponder according to a first embodiment.

Referring to FIG. 1, a transponder 110 and cover 120 combination in accordance with a first, preferred embodiment illustrated in its intended environment. The transponder 110 comprises a sealed housing which is made available to drivers from one of several companies. Circuitry internal to the transponder housing permits automatic toll payment at toll systems having the technology as described above. Several transponders are commercially available under the brand names EZ Pass, IPass, SunPass, Tolltag, Fastrak, Cruise Card, Smart Tag, Palmetto Pass, PikePass and KTag from either Mark IV Industries or Transcore. The make and style of the transponder is not material to the present invention so long as it is mounted in a location that is visible to the eye. Each transponder 110 includes a transponder circuit within the housing which is protected from the user and the elements.

In FIG. 1, the transponder mounts to the windshield 130 through cooperation of mating hook-and-loop fastener portions 140A, 140B. Alternatively, the transponder can be mounted by suction cups, via an intervening cradle, or otherwise. Typically, the transponder 110 is mounted high up on the windshield to better ensure good signal transmission to the transceiver of the automated toll system (no shown). Thus, for example, it is common to mount the transponder 110 proximate to the rearview mirror 150, to also have the transponder operate ambidextrously with transceivers that may be located on either side of the toll gate.

In locating the transponder 110 in order to optimize its cooperation with automated toll systems, the transponder housing is, unfortunately, positioned within the driver's view. The plastic housing of the transponder is not designed to coordinate with any particular vehicle interior; instead, the transponder housing is a single size and color for all vehicles. Moreover, the transponder does not include any user-operated controls or settings that need to be exposed or accessed while passing through a toll gate.

In accordance with a salient aspect of the invention, the cover 120 is combined with the transponder 110 to provide a coordinated appearance with the car when mounted on the windshield 130. A driver selects a cover 120 to coordinate with the car. The cover has an exterior surface 160 having a color, pattern, texture, material logo, monogram (e.g., stitching or a separate plate within indicia), or combination of the foregoing that can be selected so as to coordinate with the vehicle interior, the vehicle exterior, the vehicle brand, or a combination thereof. As used in this patent specification, a cover "coordinates" with a given automobile if any of the foregoing criteria are satisfied, and, more generally, if there is more than one cover available to cover a given transponder style (e.g., the cover can be selected from among a blue, beige, and black cover configurations) so that the user has more than a one-size-fits all option.

Figure 2:
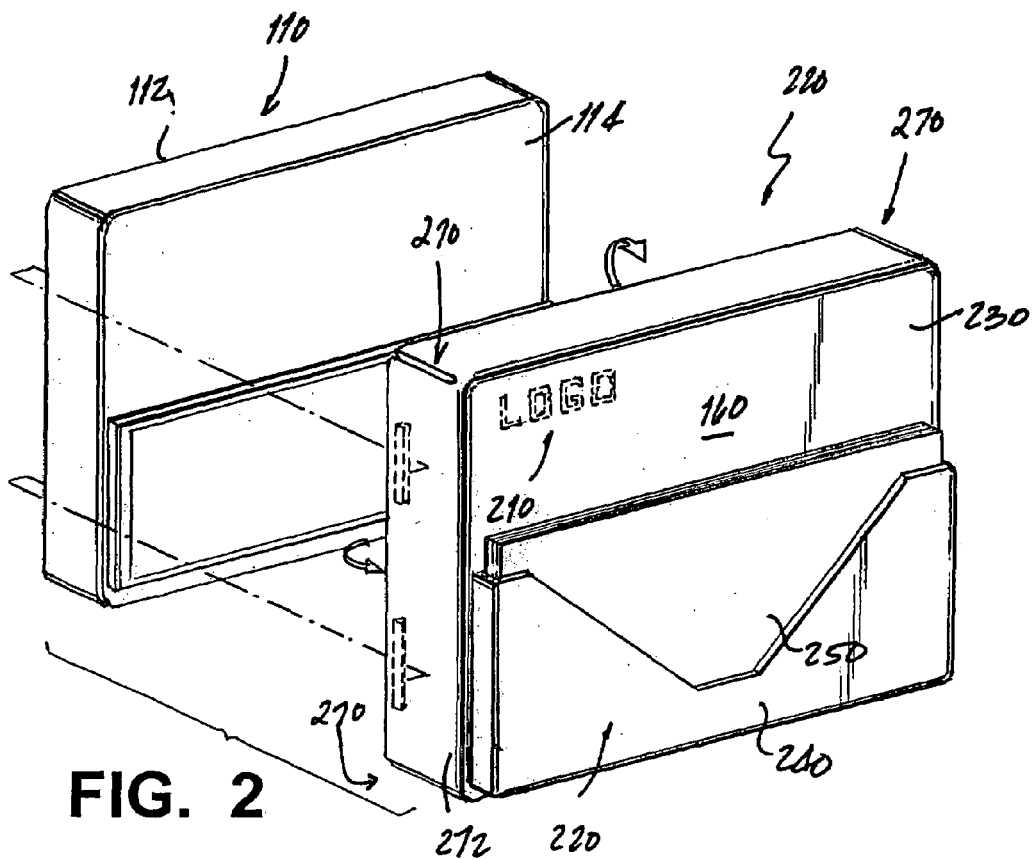
FIG. 2 is a front perspective view of the embodiment of FIG. 1 showing an optional pouch.

Thus, for example, FIG. 2 shows a brand logo 210 supported by the cover 120 and visible on the exterior surface 160. The driver might select this particular cover to coordinate with that brand of car. In practice, the logo could be a Mercedes Benz emblem or a Cadillac emblem, by way of illustration. The particular cover could have a leather exterior, a wood veneer, or a combination of these or other materials, and can be finished so as to complement and coordinate with models of a variety of car manufacturers. Optionally, the cover can provide a marketing platform to convey information to the user.

FIG. 1 illustrates a preferred engagement mechanism associated with the cover 120. In FIG. 1, the engagement mechanism comprises a set of fingers 170 on an interior surface 180 of the cover. The fingers 170 are positioned along opposing interior side walls of the cover and are sized to project from the sidewalls a distance sufficient to engage a rear wall 112 of the transponder 110 once seated within the cover 120. Preferably, the fingers resiliently flex in response to insertion or removal of the transponder from the cover. The fingers can include one or more cam surfaces to ease insertion and removal of the cover. Optionally, a soft pad 190 is deformed by a front face 114 of the transponder to maintain a tight, rattle-free engagement once the fingers 170 are seated on the rear surface 112.

FIG. 2 illustrates a variation of the engagement mechanism in which the engagement mechanism further comprises at least one pair of slits 270 in the cover 120 which permit the side walls 272 of the cover to flex outward as the transponder's housing is urged past the fingers 170.

FIG. 2 illustrates an optional pouch 220 located on a front surface 230 of the cover 120. The pouch can include a transparent pocket 240 (as shown) so that contents in the pouch can be seen. The pouch can hold a photograph, for example, but more preferably is sized to hold one or more business cards 250, or a registration/insurance card.

In a preferred embodiment, the cover is a molded plastic component or other material that does not interfere with transmissions from ETC systems. The exterior surface can be made of a lower durometer material than the interior surface in order to provide a pliable exterior. If the pouch is included, it is preferably bonded to the cover 120 by an adhesive.

Figure 3:
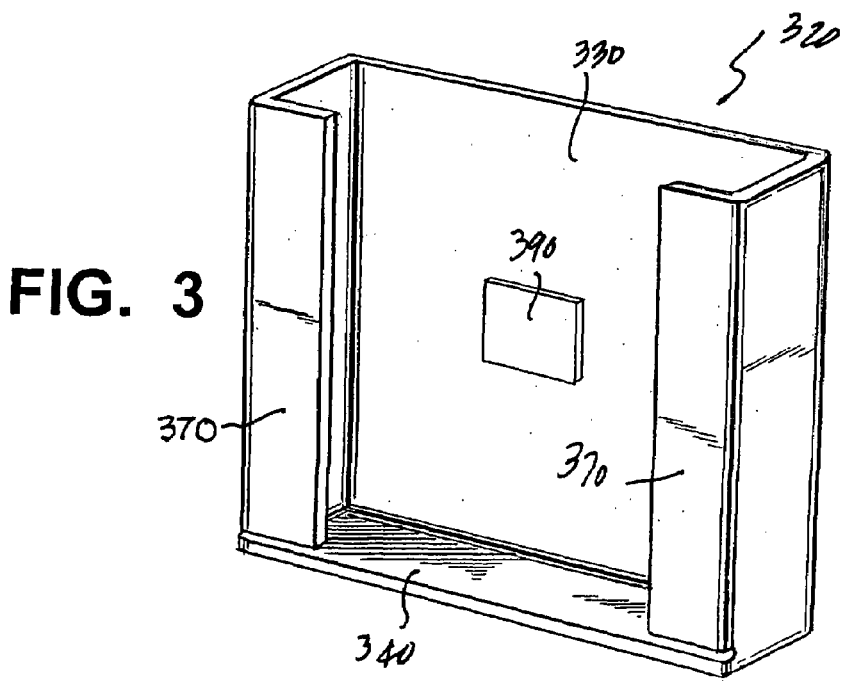
FIG. 3 is a rear perspective view of a second embodiment of the invention.

Referring now to FIG. 3, a second embodiment of a cover 320 is illustrated. The cover 320 is configured to cover the transponder 110 as previously described; however, the engagement mechanism now comprises wall portions 370 which are generally parallel to a front surface 330 of the cover and which are positioned to overlie the rear surface 112 of the transponder 110. Optionally, the wall portions 370 can be inclined toward the front wall to press against the rear surface 114 of the transponder 110. A bottom surface 340 obscures the transponder from view once seated on the windshield 130. Preferably, a soft pad 390 ensures a non-rattling engagement between the cover 320 and the transponder 110.

Figure 4:
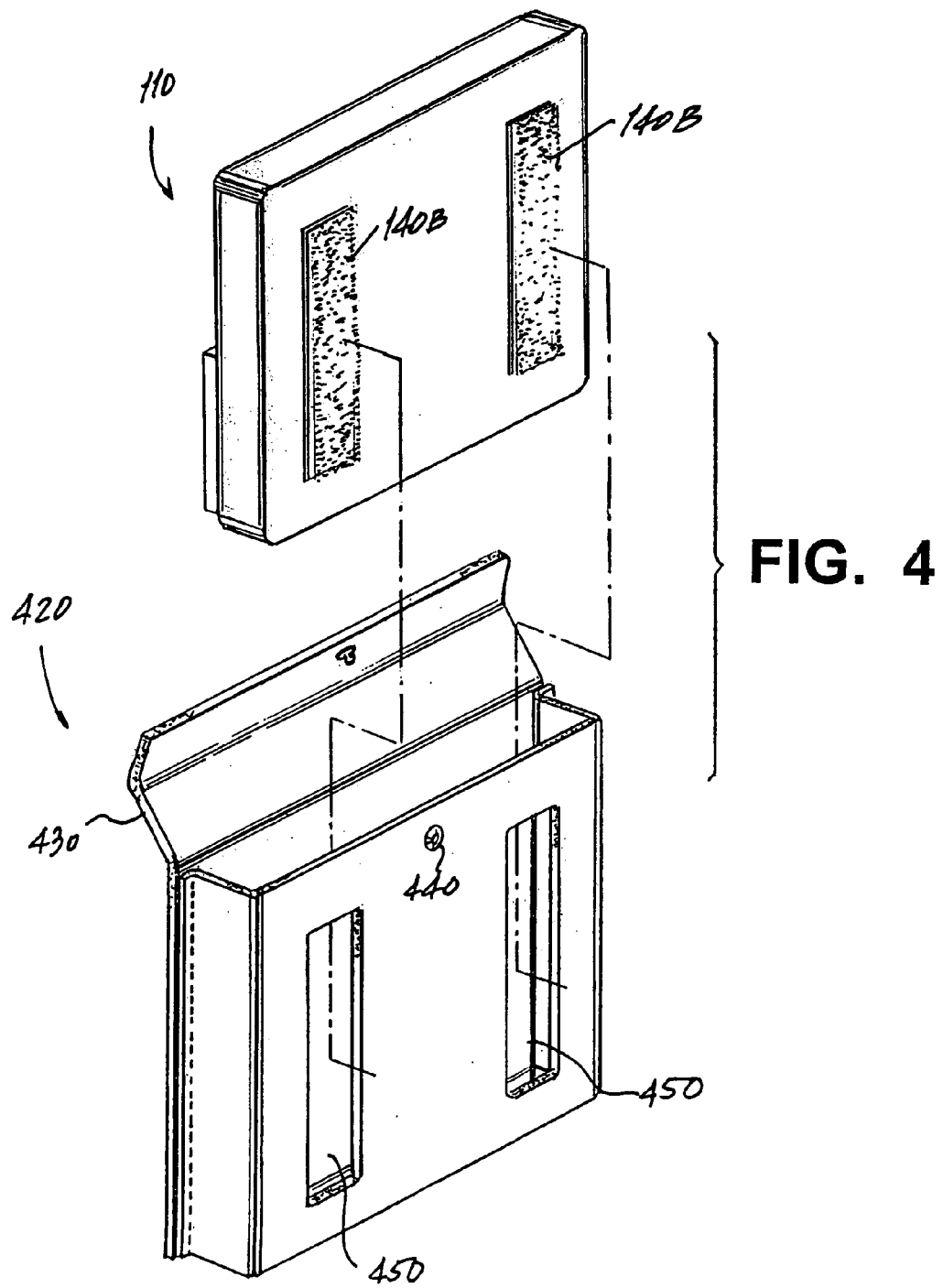
FIG. 4 is a rear perspective view of a third embodiment of the invention.

FIG. 4 shows a third embodiment in which a cover 420 is fit around the entirety of the housing of the transponder 110. That is, the cover 420 has six surfaces including a front, a back, three sides and a top that permits insertion and removal of the transponder 110. In the illustrated embodiment, the cover 420 includes a top flap 430 that can be moved between an open position for receiving the transponder and a closed position for containing the transponder. Optionally, a snap 440 or other conventional closure mechanism maintains the cover in a closed position.

FIG. 4 illustrates optional windows 450 that are sized and positioned to align with the fasteners 140B on the transponder (see FIG. 1). When the windows 450 are provided, the transponder's own fasteners 140B can be used to mount the combination to the windshield 130. Alternatively, the cover can conceal the fasteners 140B and have its own set of fasteners, such as at the location of the windows 450.

In use, a person selects a cover 120 for use in an automobile. The cover is selected so as to coordinate with the automobile as described above. The person engages the cover to the transponder. The person selects a location for mounting the transponder and mounts the transponder and cover to the automobile in a single action. In other words, the transponder and so-selected cover define an assembly that can be mounted and dismounted from the car as a unit, in the same way that transponders without covers have been mounted and dismounted.

The invention has been described in connection with several embodiments thereof but the invention is defined by the recitations in the claims below.

The invention claimed is:

1. For use in a motor vehicle including a windshield, in combination;
   a sealed housing containing a transponder circuit suitable for interacting with an automated toll gate system, the housing having a first surface configured to be mounted to the windshield and an opposing second surface;
   a cover that coordinates with the motor vehicle in accordance with at least one prescribed criterion; and
   engagement means affixed to the cover and configured for engaging the transponder housing such that the housing and cover are affixed to one another with the cover disposed over the second surface of the transponder.

2. The combination of claim 1, further comprising a monogram supported on the exterior of the cover.

3. The combination of claim 1, wherein the cover comprises a molded plastic component.

4. The combination of claim 1, wherein the engagement means comprises a set of fingers that are positioned to engage a rear surface of the transponder housing.

5. The combination of claim 1, wherein the cover includes side walls and wherein the engagement means further comprises at least one pair of slits in the side walls that permit the cover to flex outward as the trasponder's housing is urged past the engagement means.

6. The combination of claim 1, further comprising a pouch on the exterior of the cover.

7. The combination of claim 6, wherein the pouch is sized to receive at least one business card.

8. The combination of claim 6, wherein the pouch includes a transparent surface parallel to the cover whereby a picture received in the pouch can be viewed through the transparent surface.

\* \* \* \* \*